United States Patent Office 3,645,933
Patented Feb. 29, 1972

3,645,933
COATING COMPOSITION INCLUDING ISO-
CYANATE-MODIFIED POLYESTER AND
CHLORINATED RUBBER
Thomas F. Flint, Laurel Springs, N.J., assignor to The
Sherwin-Williams Company, Cleveland, Ohio
No Drawing. Filed Nov. 12, 1969, Ser. No. 876,108
Int. Cl. C08c 9/16; C08d 9/10; C08g 17/16
U.S. Cl. 260—3.3
9 Claims

ABSTRACT OF THE DISCLOSURE

There is provided an improved coating composition particularly useful for highway marking paints and characterized by extremely fast dry time. The composition includes as essential ingredients an isocyanate-modified polyester such as toluene diisocyanate modified linseed oil/glycerol/phthalate and a chlorinated rubber.

BACKGROUND OF INVENTION

This invention relates, as indicated, to an improved coating composition particularly useful where abrasion and weather resistance is required, and characterized by an extremely fast drying rate. Although uses of these compositions in the more usual applications are contemplated, a particularly suitable utilization of these compositions is in highway marking paints, and the invention will be illustrated in the context of this particular utilization.

In the past, durable and weather resistant coating compositions formulated for use as highway marking paints have been produced. These compositions have been spray or brush applied. Common practice in marking highways has been to apply a traffic marking stripe, for example, and follow shortly behind with equipment and labor for the emplacement of traffic cones to protect the stripe during drying from automotive traffic. Normal procedure in marking intersections, for example, has been to block off one-half of the roadway to enable application and allow for drying of intersection markings. In urban areas, considerable congestion is caused by such a procedure.

One effort to minimize the drying time has been an improvement in the method of application of coating compositions by a flame-spraying technique wherein the stripe was subjected to heat immediately following or during application, or the paint preheated in bulk prior to application.

The present invention is an improvement on the prior art techniques in that standard available equipment may be used for application, but the film is dry enough to withstand traffic in a period of time usually less than about five minutes after application. The coatings of the present invention are characterized by excellent adhesion, durability, and abrasion resistance as well as a dry time which minimizes labor as well as traffic congestion.

BRIEF STATEMENT OF INVENTION

Briefly stated, the present invention is in a coating composition which comprises in combination an isocyanate-modified, oil-modified polyester, e.g. an oil-modified alkyd, a chlorinated rubber and a plasticizer for the chlorinated rubber as the vehicle solids. Also included are a pigment such as those conventionally used for exterior exposure, and a solvent or solvent-diluent system. Other ingredients may be included such as stabilizers for the chlorinated rubber, drying aids, fungicidal materials, and the like, all of which are customary ingredients in coating compositions. Up to 30% by weight of the vehicle solids of an epoxy resin may also be included to give additional toughness and adhesion without affecting the very fast drying times of these systems. In general, the weight ratio of the isocyanate modified material to the chlorinated rubber is in the range of from 1:2 to 2:1. The pigment-volume concentration of the system is generally within the range of from about 10% to 75%, and the total solids of the coating composition is in the range of from about 50% to about 80%, the latter being determined largely by the mode of application to be employed.

DETAILED DESCRIPTION OF THE INVENTION

The isocyanate-modified polyester

Isocyanate-modified polyesters per se are not new, and are well known to those skilled in the art. In general, these materials are formed by reacting less than 10% by weight of an isocyanate, preferably a polyisocyanate, with an oil-modified polyester of the type normally used in coating compositions formulated primarily for exterior application. For the most part, the polyesters are formed by the reaction of a polyhydric alcohol with a dibasic carboxylic acid. The polyester is then modified by cooking with a drying oil or semi-drying oil acid or the drying oil or semi-drying oil per se.

Typical examples of polyhydric alcohols useful in forming the polyesters include glycerol, trimethylolethane, trimethylol pentane, pentaerythritol, ethylene glycol, diethylene glycol, trimethylene glycol, hexamethylene glycol, methyl glucoside, and the like. Generally, the polyhydric alcohols contain from 3 to 8 carbon atoms and contain from 2 to 4 hydroxyl groups.

The dibasic carboxylic acids are preferably aromatic. Typical examples of the preferred dibasic acids include phthalic acid, isophthalic acid, and terephthalic acid. There may be used, however, alone or in combination with such aromatic dibasic acids, acids such as maleic, adipic, fumaric, succinic, and the like.

As indicated above, the modifying agent for the polyesters may be a drying oil or a semi-drying oil or acids derived therefrom. Accordingly, oil modifying agents include as typical examples, linseed oil, safflower oil, sunflower oil, soya bean oil, tung oil, cottonseed oil, castor oil, perilla oil, and any acid or acids derived therefrom.

The techniques for forming oil modified alkyd resins are well known to those skilled in the art and need not be reproduced herein.

The preferred alkyd resins useful herein have the following general composition:

| | Percent by weight |
|---|---|
| Drying oil (e.g. alkali refined linseed oil) | 32–75 |
| Polyhydric alcohol (e.g. glycerin) | 10–32 |
| Dibasic acid (e.g. phthalic anhydride) | 15–36 |

Best results are secured with oil-modified alkyds having the following characteristics:

Sp. Gr.—0.991–1.001
Wt./Gal.—8.2–8.4
Visc.—B–E
Percent NVM—64.5 to 66.5%
Color—8 max.
Clarity—clear
Acid No.—2.5 max.

To form the isocyanate derivative of such oil-modified polyesters, the latter are reacted with a relatively small amount of an isocyanate donating reactant, preferably a polyisocyanate, and preferably in an aromatic hydrocarbon solution. Suitable aromatic hydrocarbons include benzene, toluene, xylene and commercial solvents so identified. The amount of isocyanate is less than about 10% by weight of the alkyd and normally within the range of from 4% to 6%. Suitable isocyanates include, therefore, toluene diisocyanate, m-phenylene diisocyanate, methylene-bis-(4-phenyl)diisocyanate, 4,4'-diphenyl diisocyanate, hexamethylene diisocyanate, lysine diisocyanate, and the like. Reference may be had also to Pat. 2,725,366 wherein will be found additional examples of isocyanate modified polyesters which may be used in accordance with this invention.

The chlorinated rubber

Chlorinated rubber products are well known. Those chlorinated rubbers useful herein include natural and synthetic rubbers containing from 50% to 70% chlorine by weight. As commercially obtainable, a specific material has a density of about 1.64 and a chlorine content of 67%. It is a granular yellow powder, amorphous and inelastic.

Up to about 5% by weight of the chlorinated rubber of a stabilizer may be incorporated advantageously to improve the weathering and durability of the coating of the invention. Stabilizers useful for this purpose are those normally and conventionally used to stabilize vinyl chloride plastic compositions, e.g. organo-tin stabilizers, maleate, fumarates, butyl epoxystearates, tin and cadmium salts of long chain fatty acids, $TiO_2$, magnesium phosphates, and silicates, and many others, all known to those skilled in the art. (See "Polymer Processes," Schildknecht, High Polymers, vol. X, p. 547, et seq. [1956].)

Solvents for chlorinated rubber are also well known and include aromatic hydrocarbons, e.g. benzene, toluene, xylene, styrene, ethylene dichloride, ethyl acetate, methyl ethyl ketone, methyl isobutyl ketone, propylene oxide. Diluents such as aliphatic hydrocarbons may also be used in the solvent systems of the present invention, e.g. petroleum ether, naphtha, mineral spirits, etc.

The compositions hereof may also be improved in respect of adhesion and durability by the inclusion in the vehicle solids of from 7.5% to 30% by weight of the vehicle solids of an epoxy resin, particularly a dihydric phenol/epichlorohydrin epoxy resin having an average molecular weight of from about 300 to about 3000. These resins are well known. Reference may be had to "Epoxy Resins" by H. Lee and K. Neville, McGraw-Hill Book Co., Inc., 1957, pp. 3-29 and the references cited therein on p. 29, all of which are incorporated herein by reference, and particularly U.S. Pats. 2,444,333; 2,694,694; 2,592,560. While there may be a slight loss in drying time speed, e.g. 1 to 4 minutes, the product is still extremely fast drying and has the added advantages of improved adhesion and durability.

The compositions hereof also include a plasticizer for the chlorinated rubber. Any of the well known plasticizers for this material may be used. Generally, the amount of plasticizer is that sufficient to solvate the chlorinated rubber, e.g. a weight ratio of plasticizer to chlorinated rubber of from 1:10 to 2:1. Suitable plasticizers include chlorinated hydrocarbons, e.g. chlorinated paraffin wax, chlorinated mineral oil, etc., containing from 30% to 75% by weight chlorine; chlorinated diphenyl, tricresyl phosphate, dibutyl phthalate, dioctyl phthalate, chlorostearic acid, triphenyl phosphate, epoxy resins, etc., and mixtures thereof.

It becomes convenient to provide examples illustrative of vehicles and coating compositions which may be produced in accordance with the principles of this invention.

EXAMPLE I

This example illustrates the preparation of an isocyanate modified drying oil modified polyester.

528 pounds of alkali refined linseed oil, 181 pounds of glycerine, and 1.62 pounds of lead naphthenate alcoholysis catalyst are placed in a 1000 gallon kettle and heated to 440° F. under a $CO_2$ gas blanket. The mixture is held for 2 hours at 440° F. until clear. The temperature is dropped to 390° F. and 275 pounds of molten phthalic anhydride added and the kettle sealed over a period of about 10 minutes, 14.4 pounds of xylene are added and the heat slowly increased to 440° F. as the reflux rate allows. Water is separated and the solvent reflux returned to the kettle. The batch is held for an acid value of 2.5 and a viscosity, Gardner, of B-E. After 4 hours, the batch is blown with inert gas at 5 to 10 c.f.m., cooled to 390° F., dropped and thinned. Blowing, cooling and dropping requires about 3 additional hours. Final cure time is 80" minimum, and thinning is to 65.5% solids with toluene. Average weight per gallon is 8.30 pounds.

Toluene diisocyanate is added to the linseed oil modified glyceryl phthalate polyester produced as above described under an inert gas blanket in six nearly equal weight portions at 30 minute intervals. The amount of polyester so treated is 935 pounds and the total addition of toluene diisocyanate is 40 pounds. The temperature of the polyester is maintained at 225° F. for the addition of the isocyanate. After the final addition of isocyanate, the batch is held at 225° F. until a viscosity of 16-20 stokes is obtained and a minimum cure of 10"-12". If the viscosity is 16-20, but the cure is greater than 10", toluene diisocyanate is added in very small quantities (100 cc. or less) until the cure levels off at 10". Thereafter, 25 pounds of n-butanol are added.

To produce a traffic marking paint, an isocyanate-modified, oil-modified polyester such as that produced in accordance with Example I is blended, following conventional handling methods, with a chlorinated rubber solution and with suitable pigments, solvents and diluents to yield a coating composition characterized by extremely fast drying time and excellent durability. Example II illustrates a traffic paint formulation.

EXAMPLE II

A pre-mix of the following ingredients in the indicated amounts is prepared:

| | Parts by weight |
|---|---|
| Dimethyl dioctadecyl ammonium bentonite | 4 |
| Aluminum distearate | 3 |
| Bis(2-ethylhexyl) sodium sulfosuccinate | 2 |
| Soya lecithin | 5 |
| Product of Example I | 15 |
| Aliphatic hydrocarbon solvent (200-240° F.) | 10 |

To the pre-mix there are added with stirring:
| | |
|---|---|
| Product of Example I | 126 |
| 40% chlorinated paraffin | 82 |

All the above is used to make a pigment dispersion with:
| | |
|---|---|
| Titanium dioxide (anatase) | 216 |
| Talc | 89 |
| Zinc oxide | 54 |
| Calcium carbonate (natural W.G.) | 356 |

The dispersion is then blended with a solution of:
| | |
|---|---|
| Chlorinated rubber (5 cps.) 65% $Cl_2$ | 129 |
| Methyl ethyl ketone | 97 |
| Propylene oxide | 3 |

The pigment paste and solution of urethane modified alkyd resin of Example I previously prepared are blended together and mixed with:

| | Parts by weight |
|---|---|
| Methyl ethyl ketoxime | 2 |
| Aliphatic hydrocarbon solvent (200-240° F.) | 136 |

This coating composition when applied by conventional traffic striping equipment dries in less than 5 minutes ASTM D-711 Test and demonstrates excellent durability. The pigment volume concentration in this example is within the preferred range of 40% to 70%, i.e. at 58.3%. The total solids is within the preferred range of 50% to 80%, i.e. at 71.5%. The weight ratio of the isocyanate modified polyester to the chlorinated rubber is approximately 1:1 which is within the preferred range of 1:2 to 2:1. This product may be used with or without heat; if with heat, the temperature should not exceed about 120° F.

EXAMPLE III

A pre-mix of the following ingredients in the indicated amounts is prepared:

| | Parts by weight |
|---|---|
| Product of Example I | 144 |
| Soya lecithin | 8 |
| Chlorinated paraffin wax (40% $Cl_2$) | 61 |
| Synthetic wax (stearamide+HCHO—2:1) | 4 |

To this pre-mix are added with grinding:

| | |
|---|---|
| Talc | 60 |
| Zinc oxide | 39 |
| Calcium carbonate | 218 |
| $TiO_2$-calcium base | 338 |

A cold-cut pre-mix of:

| | |
|---|---|
| Methylene chloride (Tech.) | 200 |
| Chlorinated rubber (65% $Cl_2$) | 114 |
| Propylene oxide | 3 | is used as needed in grinding the pigment paste.

The following solvent system is used to prepare the final white traffic paint:

| | Parts by weight |
|---|---|
| Methyl ethyl ketoxime | 1 |
| Methylene chloride (Tech.) | 173 |
| Methyl ethyl ketone | 58 |

This paint has a PVC of 50.18% and a total solids of 65.84% by weight. The weight per gallon is 13.93 lbs. When applied by conventional traffic striping equipment, this coating dries tack free in 2 minutes and dry-no-pick-up in 3 minutes under favorable conditions of 70° F.—and up to 50% humidity at 0.015 inch wet film and can be used with or without application of heat. By preheating the coating composition up to 120° F., the drying time is reduced by about 1 minute from a general range of 3 to 5 minutes, dry-no-pick-up, to 2 to 4 minutes, dry-no-pick-up, ASTM D–711 Test.

EXAMPLE IV

Instead of the white pigment composition of Example III, the following yellow pigment composition may be used in a formulation otherwise like Example III:

| | Parts by weight |
|---|---|
| Talc | 38 |
| Calcium carbonate | 412 |
| Zinc oxide | 38 |
| Chrome yellow (Mitsui GK28C) | 67 |
| Normal lead silicochromate (Oncor Y47) | 43 |

Such a traffic paint has a solids content of 62.3% and a weight per gallone of 13.53 lbs. This material dries tack free between 2 and 4 minutes at a film thickness of 0.015 inch in wet film. The PVC is 50%.

Following well known procedures for producing oil modified alkyds, the following alkyds may be prepared for isocyanate modification:

EXAMPLE V

| | Percent by weight |
|---|---|
| Alkali refined linseed oil | 70 |
| Pentaerythritol | 10 |
| Phthalic anhydride | 20 |

The above reactants are reacted under known conditions to yield a polyester of low acid value, i.e. <10. The resin is reduced in xylene to 65% resin solids and then reacted with 2% by weight of the resin solids of toluene diisocyanate to yield an isocyanate (urethane)-modified oil-modified alkyd resin suitable for use in the compositions of this invention.

EXAMPLE VI

| | Percent by weight |
|---|---|
| Tall oil fatty acids | 32 |
| Glycerine | 32 |
| Phthalic anhydride | 36 |

The above reactants are reacted under known conditions to yield a polyester of low acid value, i.e. <10. The product is reduced in toluene to 65% solids and reacted with 6% by weight of the resin solids of toluene diisocyanate to yield an isocyanate (urethane)-modified oil acid-modified alkyd resin suitable for use in the compositions of the invention.

EXAMPLE VII

This example illustrates a composition which also includes an epoxy resin, it being compounded in the manner set forth in Example III.

| | Lbs. |
|---|---|
| Urethane modified linseed modified alkyd (Ex. I) | 119 |
| Soya lecithin | 5 |
| Synthetic wax (stearamide+HCHO—2:1) | 3 |
| Chlorinated paraffin wax (40% $Cl_2$) | 50 |
| Talc | 40 |
| Zinc oxide | 26 |
| Calcite (Natural Water Ground) | 146 |
| $TiO_2$ (Rutile) | 227 |
| Premix: | |
|     Xylene | 135 |
|     Chlorinated rubber (67% $Cl_2$) | 94 |
|     Epichlorohydrin | 2 |
| Epon 1001 (diglycidyl ether of bisphenol A)-epoxide equivalent weight 450–525 | 113 |
| Toluene | 75 |
| Methyl ethyl ketoxime | 1 |
| Calcium octoate 5% in mineral spirits | 16 |
| Methylene chloride | 104 |

This composition has a PVC of 32.8% and a total solids of 70%.

EXAMPLE VIII

Following the procedure of Example III, the following ingredients are compounded into a gloss finish coating composition:

| | Lbs. |
|---|---|
| Urethane modified linseed alkyd of Ex. I | 87 |
| Soya lecithin | 4 |
| Synthetic wax (stearamide+HCHO—2:1) | 3 |
| Chlorinated paraffin wax (40% $Cl_2$) | 59 |
| $TiO_2$ | 170 |
| Product of Example I | 55 |
| Premix: | |
|     Xylene (5° C.) | 122 |
|     Chlorinated rubber (67% $Cl_2$) | 113 |
|     Epichlorohydrin | 2 |
| Epon 1001 (diglycidyl ether of bisphenol A) Epoxide equivalent weight 450–525 | 169 |
| Toluene | 57 |
| Methyl ethyl ketoxime | 1 |
| Calcium octoate (5% in mineral spirits) | 14 |
| Cobalt octoate (6% in mineral spirits) | 2 |
| Mineral spirits | 125 |
| Butyl Cellosolve | 15 |

The PVC of this composition is 11.33% and the total solids is 61.75% by weight.

These compositions are characterized by rapid dry times usually less than about 5 minutes, dry-no-pick-up ASTM D–711, and by excellent adhesion and durability.

What is claimed is:
1. A coating composition comprising in combination:
   (a) an aromatic diisocyanate-modified, drying oil-modified alkyd resin;
   (b) a chlorinated rubber containing from 50% to 70% by weight chlorine;
   (c) a plasticizer for said chlorinated rubber selected from the group consisting of a chlorinated hydrocarbon containing from 40% to 75% chlorine, chlorinated diphenyl, tricresyl phosphate, dibutyl phthalate, chlorostearic acid, and triphenyl phosphate, the weight ratio of plasticizer to chlorinated rubber being from 1:10 to 2:1;
(d) a pigment; and
(e) methylene chloride solvent for said polyester, said chlorinated rubber and said plasticizer; the weight ratio of (a) to (b) being in the range of 1:2 to 2:1, respectively; the pigment volume concentration of the system being in the range of from about 10% to 70%, and the total solids being in the range of from about 50% to about 80% by weight.

2. A coating composition in accordance with claim 1 wherein the diisocyanate is toluene diisocyanate.

3. A coating composition in accordance with claim 1 wherein the drying oil is linseed oil.

4. A coating composition in accordance with claim 1 wherein the oil-modified alkyd is a linseed oil-modified glyceryl phthalate.

5. A coating composition in accordance with claim 1 wherein component (a) is toluene diisocyanate-modified linseed oil-modified glyceryl phthalate.

6. A coating composition in accordance with claim 1 wherein the plasticizer is chlorinated paraffin wax containing from 40% to 75% chlorine.

7. A coating composition in accordance with claim 1 which also includes from 7.5% to 30% by weight of the vehicle solids of an epoxy resin.

8. A coating composition in accordance with claim 7 in which the epoxy resin is the reaction product of a dihydric phenol with epichlorohydrin, having an average molecular weight of from about 300 to about 3000.

9. A coating composition in accordance with claim 8 in which the epoxy resin is a reaction product of bisphenol A and epichlorohydrin.

References Cited
UNITED STATES PATENTS

| | | | |
|---|---|---|---|
| 2,798,056 | 7/1957 | Larson | 260—3.3 |
| 2,824,502 | 2/1958 | Rockwell et al. | 94—22 |
| 3,046,851 | 7/1962 | De Vries | 94—1.5 |
| 3,136,733 | 6/1964 | Ross et al. | 260—40 |
| 3,318,828 | 5/1967 | Seiner | 260—22 |

SAMUEL H. BLECH, Primary Examiner

J. SEIBERT, Assistant Examiner

U.S. Cl. X.R.

94—1.5 R, 22; 260—22 TN, 33.6 A, 33.8 R, 33.8 EP, 40 R, 45.7 P, 45.85, 45.95, 890